US009615426B2

(12) United States Patent
Hughes et al.

(10) Patent No.: US 9,615,426 B2
(45) Date of Patent: *Apr. 4, 2017

(54) DISTRIBUTING LIGHT INTENSITY READINGS IN A WIRELESS MESH

(71) Applicant: SILVER SPRING NETWORKS, INC., Redwood City, CA (US)

(72) Inventors: Sterling Hughes, Oakland, CA (US); Jana Van Greunen, III, Woodside, CA (US); Will E. San Filippo, Los Altos, CA (US)

(73) Assignee: Silver Spring Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,067

(22) Filed: Nov. 5, 2015

(65) Prior Publication Data

US 2016/0066392 A1 Mar. 3, 2016

Related U.S. Application Data

(63) Continuation of application No. 14/231,202, filed on Mar. 31, 2014, now Pat. No. 9,182,275.

(60) Provisional application No. 61/807,022, filed on Apr. 1, 2013.

(51) Int. Cl.
*G01J 1/42* (2006.01)
*H05B 37/02* (2006.01)

(52) U.S. Cl.
CPC ........ *H05B 37/0218* (2013.01); *G01J 1/4204* (2013.01); *H05B 37/0272* (2013.01); *G01J 2001/4247* (2013.01)

(58) Field of Classification Search
CPC .. G01J 1/424; G01J 2001/4247; G01J 1/4248; H04B 10/85; H05B 37/0218; H05B 37/0272
USPC .................................................. 356/213–226
See application file for complete search history.

(56) References Cited

U.S. PATENT DOCUMENTS

| 8,364,846 | B2 * | 1/2013 | Vaswani | G01D 4/004 709/245 |
| 9,182,275 | B2 * | 11/2015 | Hughes | G01J 1/4204 |
| 2004/0196783 | A1 * | 10/2004 | Shinomiya | H04L 41/0668 370/216 |
| 2008/0186202 | A1 | 8/2008 | Vaswani et al. | |
| 2008/0189415 | A1 * | 8/2008 | Vaswani | G01D 4/004 709/226 |
| 2011/0206369 | A1 * | 8/2011 | Goldner | H04B 10/85 398/25 |
| 2013/0293877 | A1 * | 11/2013 | Ramer | H05B 33/0842 356/213 |

* cited by examiner

*Primary Examiner* — Hoa Pham
(74) *Attorney, Agent, or Firm* — Artegis Law Group, LLP (57) ABSTRACT

A method for controlling a light source associated with an environment includes: receiving, over a wireless mesh network and by a control node corresponding to the light source, a first light intensity value for the environment from a first sensor node; calculating, by the control node, a resulting light intensity (RLI) value based on the first intensity value; determining, by the control node, that the RLI value exceeds a light intensity threshold; and modifying, by the control node and in response to determining the RLI value exceeds the light intensity threshold, an output of the first light source.

20 Claims, 4 Drawing Sheets

FIG. 4

DISTRIBUTING LIGHT INTENSITY READINGS IN A WIRELESS MESH

CROSS-REFERENCE TO RELATED APPLICATIONS

This application is a continuation of the co-pending U.S. patent application titled, "DISTRIBUTING LIGHT INTENSITY READINGS IN A WIRELESS MESH," filed on Mar. 31, 2014 and having Ser. No. 14/231,202, which claims the benefit of the U.S. provisional patent application titled, "REDUCING THE NUMBER OF PHOTOCELLS REQUIRED BY LOCALLY DISTRIBUTING PHOTOCELL READING IN A WIRELESS MESH," filed on Apr. 1, 2013 and having Ser. No. 61/807,022. The subject matter of these related applications are hereby incorporated herein by reference.

BACKGROUND

Many lighting systems (e.g., street lights, decorative lights) are controlled by light sensors (e.g., photocells) that detect ambient light in an environment (e.g., sunlight, daylight) in which the lighting systems are placed. For example, street lights can be turned on when the ambient light decreases below a threshold value and turned off when the ambient light increases above the threshold value. Light sensors can be expensive and/or cumbersome to install and maintain on every light source (e.g., individual street light) and therefore a system is needed to reduce the number of light sensors required in a lighting system.

SUMMARY

In general, in one aspect, the invention relates to a method for controlling a light source associated with an environment. The method comprises: receiving, over a wireless mesh network and by a control node corresponding to the light source, a first light intensity value for the environment from a first sensor node; calculating, by the control node, a resulting light intensity (RLI) value based on the first intensity value; determining, by the control node, that the RLI value exceeds a light intensity threshold; and modifying, by the control node and in response to determining the RLI value exceeds the light intensity threshold, an output of the first light source.

In general, in one aspect, the invention relates to a method for controlling a plurality of light sources associated with an environment. The method comprises: measuring, by a light sensor in a sensor node, a light intensity value for the environment; and sending, by the sensor node and over a wireless mesh network, the light intensity value to a plurality of control nodes corresponding to the plurality of light sources, wherein the plurality of control nodes modify outputs of the plurality of light sources in response to the light intensity value exceeding a light intensity threshold.

In general, in one aspect, the invention relates to a system for controlling a plurality of light sources associated with an environment. The system comprises: a first sensor node configured to obtain a first light intensity value for the environment; a wireless mesh network connected to the first sensor node; and a first control node corresponding to a first light source of the plurality of light sources and configured to: receive the first light intensity value over the wireless mesh network; calculate a resulting light intensity (RLI) value based on the first intensity value; determine that the RLI value exceeds a light intensity threshold; and modify, in response to determining the RLI value exceeds the light intensity threshold, an output of the first light source.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a lighting system controlled by light sensors in an environment. Specifically, one or more embodiments of the invention provide a method and system for modifying a current delivered to light sources of the lighting system based on readings from sensor nodes containing light sensors. The light sensors determine an intensity of the ambient light in the environment and the light sources are switched on when the ambient light falls below a threshold level. Sensor nodes may be positioned on or in the vicinity of light sources and communicate with control nodes on the light sensors via a wireless mesh network. Because the sensors and light sources are decoupled, fewer sensors nodes are required than the number light sources to control the lighting system.

Figure 1:
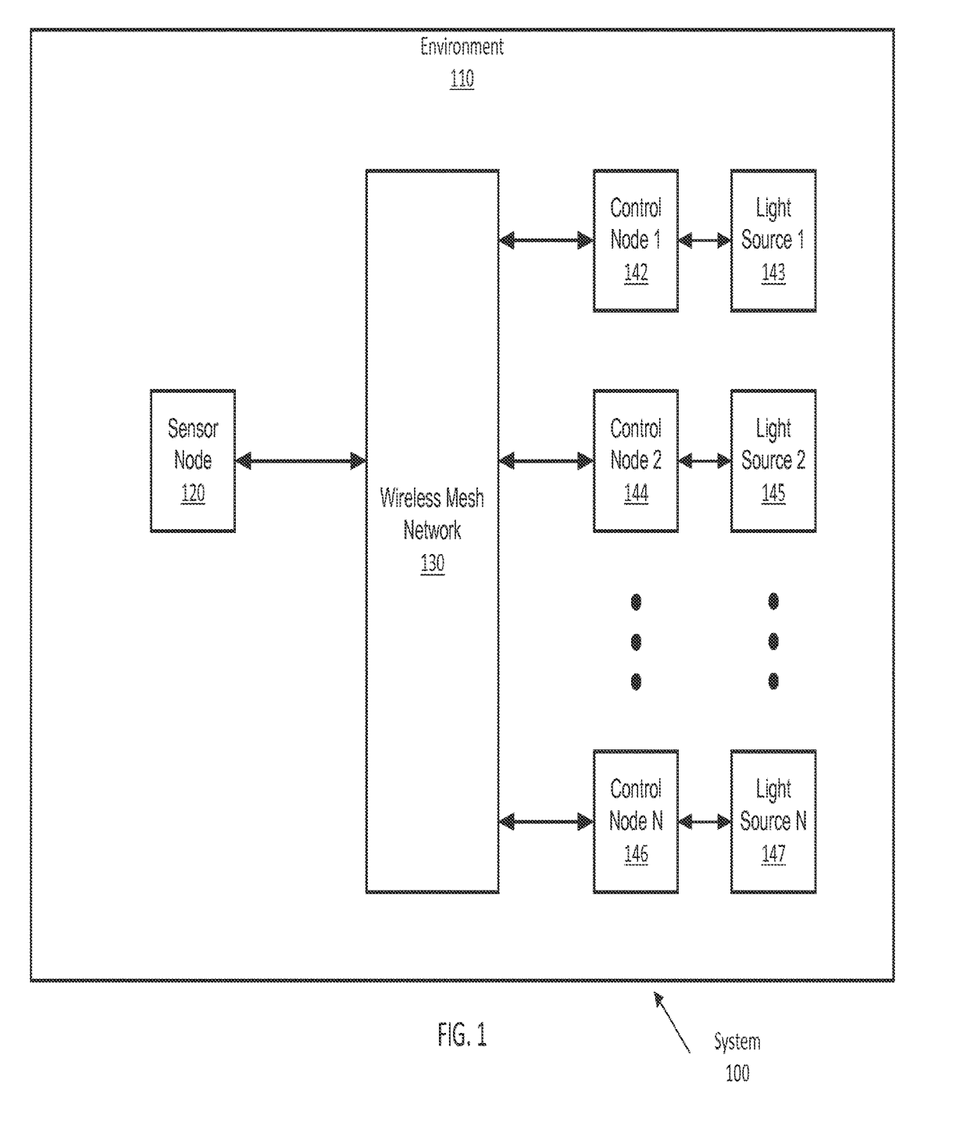
FIGS. 1-3 show schematic system diagrams in accordance with one or more embodiments of the invention.

FIG. 1 shows a diagram of a system (100) in accordance with one or more embodiments of the invention. The system (100) includes an environment (110) containing a sensor node (120), a wireless mesh network (130), and a plurality of control nodes (i.e., control node 1 (142), control node 2 (144), and control node N (146)) and corresponding light sources (i.e., light source 1 (143), light source 2 (145), and light source N (147)). The sensor node is connected, via the wireless mesh network (130), to the control nodes (i.e., control node 1 (142), control node 2 (144), and control node N (146)). The control nodes control the respective light sources (i.e., light source 1 (143), light source 2 (145), and light source N (147)). Each of these components is further described below.

In one or more embodiments of the invention, the environment (110) is any volume of space that contains light sources (e.g., a neighborhood containing street lights, the inside of a building (e.g., mall, parking lot), a room in a building, a stadium, a transit station, an airport, etc.). The environment (110) may, at certain times, contain ambient light (e.g., sunlight, daylight, electrical light) that comes from any sources of light (e.g., sun, lights not controlled by system (100)) and the light sources (i.e., light source 1 (143), light source 2 (145), and light source N (147)) part of system (100). At other times, the ambient light may completely diminish or decrease to a level that is below a required threshold (e.g., at a level that makes seeing difficult for humans). In one or more embodiments of the invention, the ambient light in the environment (110) is approximately uniform (e.g., the luminosity of the ambient light varies with a standard deviation of 20% or less in the volume within the environment).

In one or more embodiments of the invention, the sensor node (120) includes a light sensor (e.g., a photocell, photodiode, photoresistor, phototransistor, single-photon detector, radiometer, charged-coupled device (CCD), a camera, etc.). The sensor node may also include a readout circuit (not shown) for amplification and digitization of the light intensity output from the light sensor, a processor (not shown), and a radio (not shown) for communicating with the wireless mesh network (130). Light intensity, as referred to in this application, is any measure of the level of light, for example, luminosity, irradiance, radiant intensity, radiance, illuminance, and/or luminance. In one or more embodiments of the invention, the sensor node (120) detects the intensity of ambient light, produces a light intensity value (not shown), and sends the light intensity value via the radio to the wireless mesh network (130). The sensor node (120) may be positioned in the environment (110) so that it produces a robust reading of the intensity of ambient light (e.g., on a streetlight post, on a side of a building). In one or more embodiments of the invention, the sensor node (120) may itself be part of the wireless mesh network (130). In fact, the sensor node (120) may be a node of the wireless mesh network (130) that includes a light sensor. In one or more embodiments of the invention, the sensor node (120) may be mounted on the same structure supporting the light sources (i.e., light source 1 (143), light source 2 (145), and light source N (147)) (e.g., same streetlight, same ceiling, same building, etc.). Although FIG. 1 shows the sensor node (120) and the light sources (143, 145, 147) within the environment (110), in other embodiments of the invention, at least one of the light sources (143, 145, 147) is external to the environment (e.g., the light source is indoors while the sensor node is outdoors; the light source is inside a vehicle while the sensor node is outside the vehicle; etc.).

In one or more embodiments of the invention, the wireless mesh network (130) includes one or more network nodes connected over a wireless network protocol (e.g., ZigBee). The wireless mesh network (130) may route light intensity values generated by the sensor node (120) to one or more control nodes (i.e., control node 1 (142), control node 2 (144), control node N (146)). The light intensity values may be broadcasted to the control nodes (142, 144, 146) over the wireless mesh network (130). Additionally or alternatively, the light intensity values may be delivered to individual control nodes (142, 144, 146) by unicast packets. Each of the unicast packets may specify an identifier or network address (e.g., IP address) of a particular control node (e.g., 142, 144, 146) along with the light intensity value. Each control node (142, 144, 146) may include a lookup table (not shown) storing the identifier or network address of some or all of the control nodes (142, 144, 146). The wireless mesh network (130) may route the light intensity value via multiple hops (i.e., transfers between nodes in the wireless mesh network (130)) to control node 1 (142). The wireless mesh network (130) is further discussed in reference to FIG. 2.

Continuing with FIG. 1, in one or more embodiments of the invention, the control nodes (i.e., control node 1 (142), control node 2 (144), control node N (146)) include a radio receiver (not shown), a processor (not shown), and a driver circuit (e.g., current mirror, digital switch, not shown) for controlling a current input to the light sources (i.e., light source 1 (143), light source 2 (145), and light source N (147)). The control nodes (i.e., control node 1 (142), control node 2 (144), control node N (146)) receive a light intensity value from the sensor node (120) routed by the wireless mesh network (130) and convert the signal into a current inputted to the light sources (i.e., light source 1 (143), light source 2 (145), and light source N (147)). For example, when the light intensity is high, the current is turned off or shunted away from the light sources (i.e., light source 1 (143), light source 2 (145), and light source N (147)) and the light sources (i.e., light source 1 (143), light source 2 (145), and light source N (147)) turn off or dim. On the other hand, when the light intensity is low, the current is turned on or routed into the light sources (i.e., light source 1 (143), light source 2 (145), and light source N (147) and the light sources (i.e., light source 1 (143), light source 2 (145), and light source N (147)) turn on or brighten. In other words, the control nodes (142, 144, 146) modify the light output of the multiple light sources (143, 145, 147).

In one or more embodiments of the invention, there exists one or more light intensity thresholds such that when the light intensity value crosses one of the light intensity thresholds, the control nodes (i.e., control node 1 (142), control node 2 (144), control node N (146)) trigger a change in the current driving the light sources (i.e., light source 1 (143), light source 2 (145), and light source N (147)). One or more of the light intensity thresholds may be sent to the control nodes (142, 144, 146) over the wireless mesh network (130) (i.e., the one or more thresholds may be updated at any time and the updated threshold may be sent wirelessly to the control nodes (142, 144, 146)). The control nodes (i.e., control node 1 (142), control node 2 (144), control node N (146)) may themselves be part of the wireless mesh network (130). In one or more embodiments of the invention, the control nodes (i.e., control node 1 (142), control node 2 (144), control node N (146)) are nodes of the wireless mesh network (130) that are in physical connection (e.g., wired) to the light sources (i.e., light source 1 (143), light source 2 (145), and light source N (147)) and include a driver circuit (not shown).

In one or more embodiments of the invention, the light sources (i.e., light source 1 (143), light source 2 (145), and light source N (147)) are any electric or chemical powered sources of light (e.g., incandescent lamps, light emitting diodes (LEDs), gas discharge lamps, plasma lamps, etc.). The light sources (i.e., light source 1 (143), light source 2 (145), and light source N (147)) are designed to brighten at least a part of the environment (110) (e.g., like streetlamps, ceiling lamps, walkway lamps, vehicle lamps, etc.), in accordance with one or more embodiments of the invention. The light sources (i.e., light source 1 (143), light source 2 (145), and light source N (147)) may be either powered by or controlled with the current driven by the control nodes (i.e., control node 1 (142), control node 2 (144), control node N (146)). When the light sources (i.e., light source 1 (143), light source 2 (145), and light source N (147)) are turned on, they may increase the level of ambient light in the environment (110). Consequently, the light sensor (120) may detect more ambient light. Those skilled in the art will appreciate that the configuration in FIG. 1 forms a negative feedback loop, and that the final result will be that the light sources (i.e., light source 1 (143), light source 2 (145), and light source N (147)) make up (compensate) for any loss in ambient light, for example, due to the sun setting. In one or more embodiments of the invention, the light sources (i.e., light source 1 (143), light source 2 (145), and light source N (147)) do not change the level of detected ambient light significantly.

Figure 2:
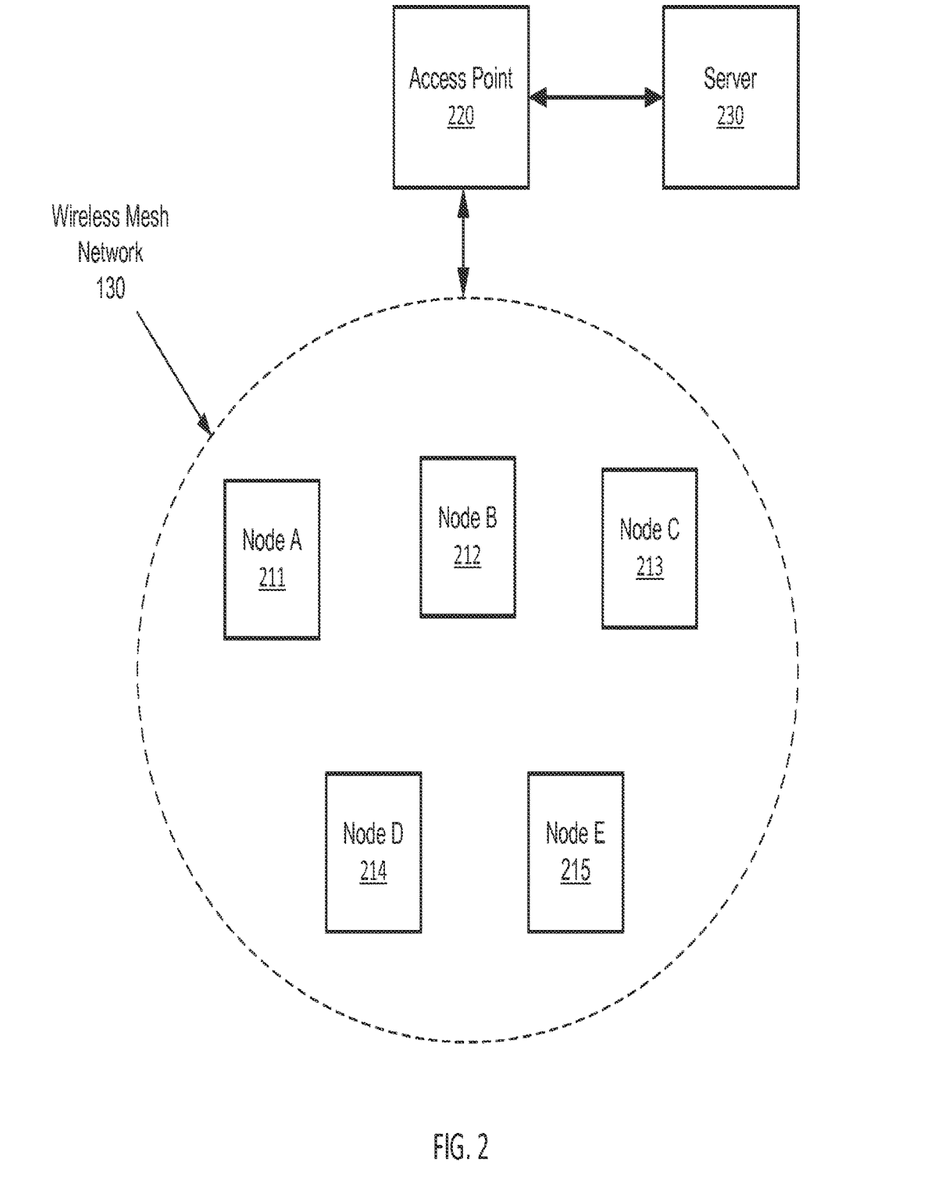

FIG. 2 shows a diagram of the wireless mesh network (130) in accordance with one or more embodiments of the invention. The wireless mesh network (130) includes one or more network nodes (i.e., node A (211), node B (212), node C (213), node D (214), and node E (215)). The wireless mesh network (130) may output data (e.g., signal readings) or accept data (e.g. commands) from a server (230) via an access point (220). Each of these components is further described below.

In one or more embodiments of the invention, the network nodes (i.e., node A (211), node B (212), node C (213), node D (214), and node E (215)) include a processing unit (not shown) for signal processing and a wireless radio (not shown) for sending/receiving data. In general, the network nodes (i.e., node A (211), node B (212), node C (213), node D (214), and node E (215)) in a wireless mesh network (130) are responsible for not only sending and receiving data pertaining to said node, but also for routing data from other sources (e.g., access point (220), other nodes) to other destinations (e.g., access point (220), other nodes). Those skilled in the art will appreciate that this configuration allows the wireless mesh network (130) to function without centralized control. Further, the wireless mesh network (130) is capable of functioning if a node or a link between two nodes exhibit failure, as there may be multiple paths from any source to any destination. In one or more embodiment of the invention, each node (i.e., node A (211), node B (212), node C (213), node D (214), and node E (215)) stores (e.g., in a local memory) a list of nearby neighbors that are used for determining which nodes to route data to. Alternatively, in one or more embodiments, the each node (i.e., node A (211), node B (212), node C (213), node D (214), and node E (215)) may broadcast or multicast data to at least two other nodes or all nodes in order to route data. In one or more embodiments of the invention, the nodes (i.e., node A (211), node B (212), node C (213), node D (214), and node E (215)) route the signal from the sensor nodes (e.g., FIG. 1, 120) to control nodes (e.g., FIG. 1, control node 1 (142), control node 2 (144), control node N (146)). The nodes may use one or more network protocols (e.g., ZigBee, Ad hoc On-Demand Distance Vector (AODV)) to communicate with each other and thus form a wireless mesh network (130).

In one or more embodiments of the invention, the access point (220) is an electronic device that connects the wireless mesh network (130) to the server (230). The access point includes a wireless radio that may send/receive data to/from the wireless mesh network (130) and an output port (e.g., Ethernet connection, USB connection, WiFi connection, etc.) to route data to/from the server (230). The access point (230) may also connect to another network (e.g., another wireless mesh network, a wide area network (WAN), the Internet, etc.).

In one or more embodiments of the invention, the server (230) is a computing device (e.g., dedicated server, personal computer, cloud service, etc.) that may send/receive data to/from the wireless mesh network (130) via the access point (220). The server (230) may be used to monitor the wireless mesh network (130) (e.g., check status of the nodes, check light intensity value values from sensor nodes, check status of light control nodes, etc.). Although the wireless mesh network (130) may not need centralized control, the server (230) may also be used to perform control functions (e.g., change network settings such as frequency or power output, change sensitivity of sensor nodes, change network protocol, etc.).

In one or more embodiments of the invention, although FIG. 1 and FIG. 2 depict the sensor node (FIG. 1, 120) and control nodes (FIG. 1, control node 1 (142), control node 2 (144), control node N (146)) as disparate from the nodes (211, 212, 213, 214, 215), the nodes (211, 212, 213, 214, 215) in the wireless mesh network (130) may include the sensor node (FIG. 1, 120) and the control nodes (FIG. 1, control node 1 (142), control node 2 (144), control node N (146)). The sensor nodes and control nodes may fulfill the functionality of a node in the wireless mesh network (130) (i.e., signal routing) in addition to light sensing (in the case of the sensor node (FIG. 1, 120)) and controlling light sources (in the case of the control nodes (FIG. 1, control node 1 (142), control node 2 (144), control node N (146))).

Figure 3:
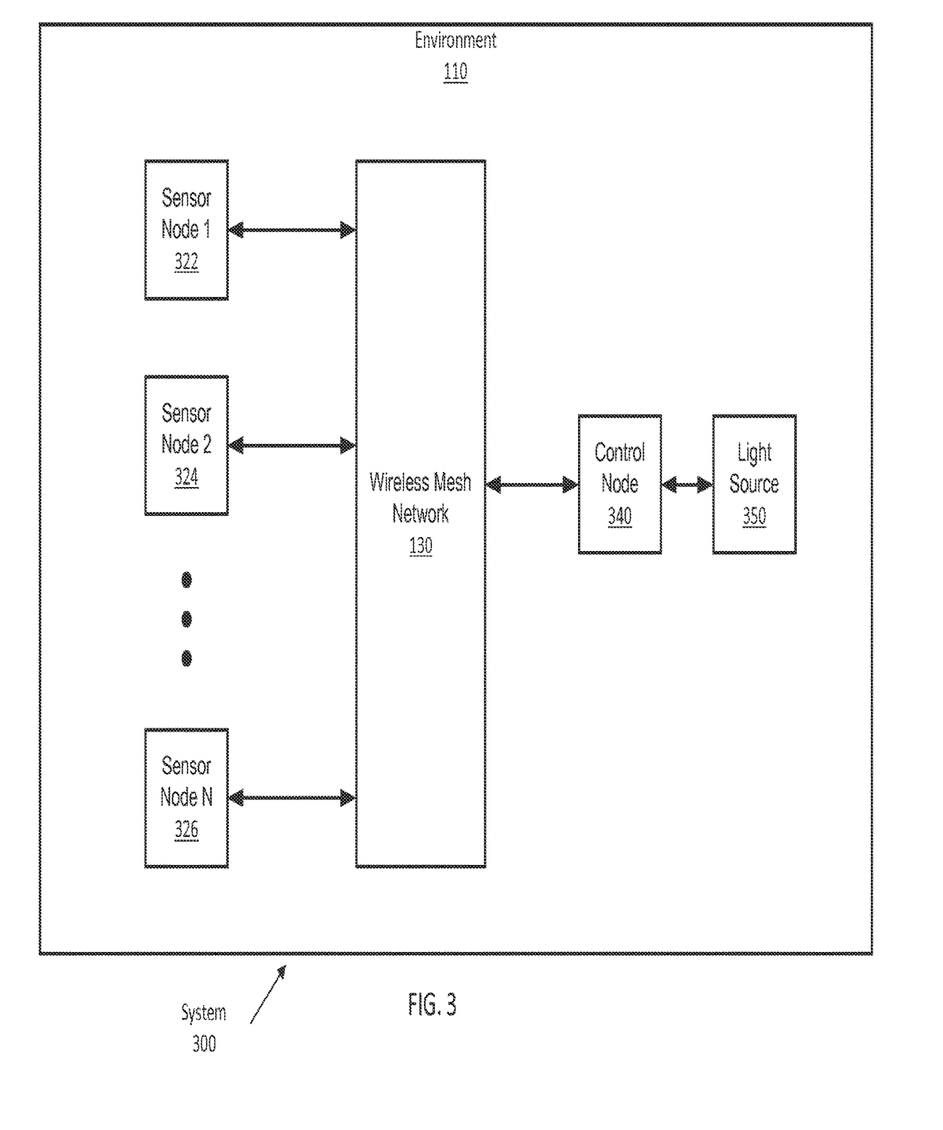

FIG. 3 shows a diagram of a system (300) in accordance with one or more embodiments of the invention. The system (300) includes an environment (310) containing a plurality of sensor nodes (i.e., sensor node 1 (322), sensor node 2 (324), sensor node N (326)), a wireless mesh network (130), a control node (340), and a light source (350). The sensor nodes (i.e., sensor node 1 (322), sensor node 2 (324), sensor node N (326)) are connected, via the wireless mesh network (130), to the control node (340). The control node (340) controls the light output of light source (350). Although FIG. 3 only shows one light source (350), there may be multiple light sources.

In one or mode embodiments of the invention, the sensor nodes (i.e., sensor node 1 (322), sensor node 2 (324), sensor node N (326)) are essentially the same as the sensor node (FIG. 1, 120). In one or mode embodiments of the invention, the control node (340) and light source (350) are essentially the same as the control nodes (FIG. 1, control node 1 (142), control node 2 (144), control node N (146)) and light sources (FIG. 1, light source 1 (143), light source 2 (145), and light source N (147)).

In one or mode embodiments of the invention, the control node (340) receives multiple light intensity values from multiple sensor nodes (i.e., sensor node 1 (322), sensor node 2 (324), sensor node N (326)). The control node generates a resulting light intensity (RLI) value based on the multiple light intensity values. The RLI value may then be used by the control node (340) to modify the output of the light source (350). For example, when the RLI value exceeds a light intensity threshold, the control node (340) may decrease current driving the light source (350). On the other hand, when the RLI value is smaller than the light intensity threshold, the control node (340) may increase the current driving the light source (350).

The RLI value may be calculated in several ways. In one or more embodiments of the invention, the RLI value is an average or weighted average of multiple light intensity values. Those skilled in the art will appreciate that by calculating the average of multiple light intensity values, the control node may obtain a more accurate representation of the ambient light than by only using one light intensity value in the calculation of the RLI value. In another embodiment, the RLI value may be a minimum or maximum of the multiple light intensity values. In another embodiment, the RLI value is the median of the multiple light intensity values. Those skilled in the art will appreciate that the median may be preferable to the average in cases where one or more light intensity values may be abnormally high or low due to, for example, a light sensor malfunction. In another embodiment, the RLI value is a percentile (e.g., 75.sup.th percentile) of the multiple light intensity values.

In one or more embodiments of the invention, the control node (340) utilizes previously received light intensity values in determining whether to modify the output of the light source (i.e., change the current driving the light source). Those skilled in the art, having the benefit of this detailed description, will appreciate that using previous samples of the light intensity value may increase the accuracy of the sensor especially when the light intensity value is noisy. For example, a control node may obtain light intensity values of 10,000 lux at 7:00 pm, 9,900 lux at 7:10 pm, and 10,100 lux at 7:20 pm, where the third sample (i.e., the 10,100 lux value) is actually 9,800 lux plus 300 lux of noise. Taking the average of the last 3 samples produces is (10,000+9,900+10,100)/3=10,000 lux, which is closer to the actual value of 9,800 lux than the third sample of 10,100 lux. In one or more embodiments of the invention, the past (historical) measurements may be weighted (e.g., attenuated by 5% per minute) to account for the fact the measurements are not current. Those skilled in the art, having the benefit of this detailed description, will appreciate that that technique of using previous samples in the determination may be combined with the technique of combining multiple light intensity values to calculate an RLI value, as discussed above.

In one or more embodiments of the invention, the control node (340) uses the distance of the sensor nodes (322, 324, 326) from the light source (350) in the determination of the RLI value. For example, if sensor node 1 (322) is closer to the light source (350) than sensor node 2 (324), then it may be desirable to assign more weight to the light intensity value produced by sensor node 1 (322) and less weight to the light intensity value produced by sensor node 2 (324) in the calculation of the RLI value. For example, suppose that the light intensity value of sensor node 1 (322) is 10,000 lux and the sensor is 10 m away from the light source (350), whereas the light intensity value of sensor node 2 (324) is 9,000 lux and it is 140 m away from the light source. In the case that there is a 5% attenuation factor for each 10 m a sensor node is away from the light source, the RLI value may be calculated to be (0.95.times.10,000+0.30.times.9,000)/(0.95+0.30)=9,760 lux, thus favoring the reading from the closer sensor node (i.e., sensor node 1 (322)). Distances between nodes may be obtained through may techniques including triangulation, signal strength calculation, pre-stored positions in memory, counting the number of hops, and any other standard techniques known to those skilled in the art to determine distance between nodes in a wireless mesh network (130).

Those skilled in the art, having the benefit of this detailed description, will appreciate that by decoupling sensor nodes from control nodes attached to light sources (i.e., light source 1 (143), light source 2 (145), and light source N (147)), fewer sensor nodes (and thus less light sensors) may be used to control the light sources (i.e., light source 1 (143), light source 2 (145), and light source N (147)). For example, a sensor node may be positioned every 5-10 streetlights in order to detect the level of ambient light. Because sensor nodes are decoupled from control nodes, the system (FIG. 1, 100, FIG. 3, 300) may be less expensive to set up than that with every control node including a light sensor. Further, in the case of decorative lighting where light sensors may take away from the appearance of the light source, the system (FIG. 1, 100, FIG. 3, 300) allows the light sensors to be placed away from the light sources.

In one or more embodiment of the invention, the sensor node (120) includes other types of sensors (e.g., temperature sensor, pressure sensor, humidity sensor, etc.) instead of or in addition to the light sensor. Those skilled in the art, having the benefit of this written description, will appreciate that the systems described in reference to FIGS. 1-3 can be extended to other types of sensors. For example, a temperature sensors may be used in conjunction with a heater to control the temperature (e.g., keep an environment (e.g., FIG. 1, 110) at a constant temperature). In another example, a humidity sensors may be used in conjunction with a humidifier to control the humidity (e.g., keep an environment (e.g., FIG. 1, 110) at a constant humidity). In yet another example, a pressure sensor may be used in conjunction with a compressor to control the pressure (e.g., keep the pressure in an environment (e.g., FIG. 1, 110) constant). Those skilled in the art, having the benefit of this detailed description, will appreciate that all the techniques of signal routing and processing described above may be used for any type of sensor and signal source combination, and that this invention applies to all such sensor/signal source pairs.

Figure 4:
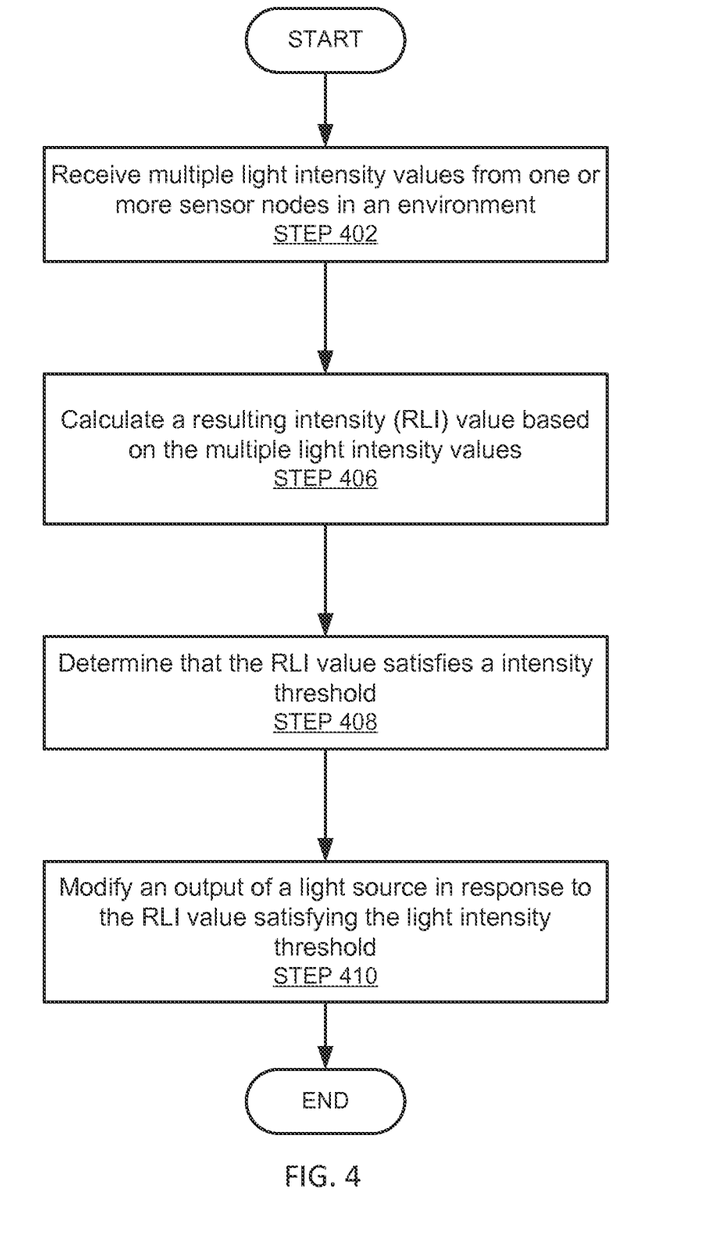
FIG. 4 shows a flowchart in accordance with one or more embodiments of the invention.

FIG. 4 shows a flowchart in accordance with one or more embodiments of the invention. The process shown in FIG. 4 may be executed, for example, by one or more components (e.g., control node (340), light source (350), etc.)) discussed above in reference to FIG. 3. One or more steps shown in FIG. 4 may be omitted, repeated, and/or performed in a different order among different embodiments. Accordingly, embodiments should not be considered limited to the specific number and arrangement of steps shown in FIG. 4.

Initially, multiple light intensity values are received (STEP 402). The light intensity values are received by a control node over a wireless mesh network. The light intensity values are received from one or more sensor nodes. For example, all of the light intensity values may be received from a single sensor node and represent different light intensity measurements over/during a time window. Additionally or alternatively, the light intensity values may be received from multiple sensors positioned at different distances from the control node. The received light intensity values may be specified in packets received by the control node. The packets may be unicast packets targeted (i.e., addressed) for the control node. Additionally or alternatively, one or more packets may be broadcast packets that are received by many control nodes attached to the wireless network.

In STEP 406, a resulting light intensity (RLI) value is calculated based on the multiple light intensity values. Different weights may be assigned to different light intensity values. In embodiments where the multiple light intensity values come from a single sensor node over/during a time window, older values are given smaller weights while younger values are given larger weights. In embodiments where the multiply light intensity values come from multiple sensor nodes, values from sensor nodes in close proximity to the control node are given larger weights while values from sensor nodes far away from the control node are given smaller weights. In one or more embodiments, none of the light intensity values are weighted. In one or more embodiments of the invention, the RLI value is a weighted average of the multiple intensity values. In one or more embodiments of the invention, the RLI value is the median of the light intensity values.

In STEP 408, it is determined that the RLI value satisfies (e.g., exceeds) a light intensity threshold. In STEP 410, an output of the light source connected to the control node is modified in response to the RLI value satisfying the threshold. In other words, the control node may modify the electrical current being supplied to the light source.

Although FIG. 4 shows only a single threshold, in other embodiments of the invention, the control node may have multiple light intensity thresholds. These thresholds may have been programmed by a manufacturer. Additionally or alternatively, these thresholds may be received over the wireless mesh network and may be updated at any time. A single threshold may be used to move the light source from an off-state to a fully on-state (or vice versa). Multiple thresholds may be used to increment the light source from the off-state to the fully on-state. Similarly, multiple threshold may be used to dim the light source from the fully on-state to the off-state. The process shown in FIG. 4 may be repeated any number of times, and the RLI value may be compared against some or all of the multiple thresholds.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling a light source via a wireless mesh network, the method comprising:
   receiving via the wireless mesh network a first light intensity value from a first sensor that detects ambient light in an environment, the environment including the light source;
   calculating a resulting light intensity (RLI) value based on the first light intensity value;
   determining that the RLI value exceeds a light intensity threshold; and
   modifying an output of the light source based on the RLI value exceeding the light intensity threshold.

2. The method of claim 1, wherein modifying the output transitions the light source from an off-state to an on-state.

3. The method of claim 1, further comprising, prior to calculating the RLI value, receiving the light intensity threshold via the wireless mesh network.

4. The method of claim 1, wherein the first sensor comprises a light sensor that generates the first light intensity value based on an amount of ambient light in the environment.

5. The method of claim 1, further comprising:
   receiving via the wireless mesh network a second light intensity value from a second sensor that detects ambient light in the environment,
   wherein the RLI value is calculated based on the second light intensity value as well.

6. The method of claim 5, wherein the RLI value comprises an average of the first light intensity value and the second light intensity value.

7. The method of claim 1, wherein the ambient light comprises sunlight, and wherein the light source comprises a street lamp.

8. The method of claim 1, wherein the light source is coupled to a control node that performs the steps of receiving, calculating, determining, and modifying.

9. A method for controlling a plurality of light sources via a wireless mesh network, the method comprising:
   measuring via a light sensor a light intensity value that detects ambient light in an environment, the environment including the plurality of light sources; and
   transmitting via the wireless mesh network the light intensity value to a plurality of control nodes, wherein each control node corresponds to a different light source included in the plurality of light sources, wherein each control node modifies an output of the light source corresponding to the control node in response to the light intensity value exceeding a light intensity threshold.

10. The method of claim 9, wherein the ambient light comprises sunlight, and wherein the light source comprises a street lamp.

11. The method of claim 9, wherein transmitting the light intensity value comprises broadcasting the light intensity value over the wireless mesh network.

12. The method of claim 9, wherein transmitting the light intensity values comprises sending a unicast packet over the wireless mesh network to each control node included in the plurality of control nodes.

13. The method of claim 12, further comprising:
    accessing a network address for each control node in the plurality of control nodes; and
    generating the unicast packets based on the network addresses.

14. A system for controlling a plurality of light sources included in an environment, the system comprising:
    a first sensor configured to obtain a first light intensity value that detects ambient light in the environment;
    a first control node that corresponds to a first light source included in the plurality of light sources; and
    a wireless mesh network that couples the first sensor to the first control node, wherein
    the first control node is configured to:
      receive via the wireless mesh network the first light intensity value,
      determine, based on the first light intensity value, that a light intensity threshold is exceeded, and
      modify an output of the first light source based on the light intensity threshold being exceeded.

15. The system of claim 14, wherein the first control node is further configured to calculate a resulting light intensity (RLI) value based on the first light intensity value, and determining comprises determining that the RLI value exceeds the light intensity threshold.

16. The system of claim 14, further comprising:
    a second sensor configured to obtain a second light intensity value that detects ambient light in the environment; and
    a second control node that corresponds to a second light source included in the plurality of light sources and configured to:
      receive via the wireless mesh network the first light intensity value,
      receive via the wireless mesh network the second light intensity value;
      calculate a weighted average from the first light intensity value and the second light intensity value;
      determine that the weighted average exceeds the light intensity threshold; and
      modify an output of the second light source based on the weighted average exceeding the light intensity threshold.

17. The system of claim 16, wherein the second control node is connected to the second light source.

18. The system of claim 16, wherein the second sensor is further configured to generate a first unicast packet for the second light intensity value for the first control node and to generate a second unicast packet for the second light intensity value for the second control node.

19. The system of claim 16, wherein the second sensor is associated with a lookup table that stores a first network address for the first control node and a second network address for the second control node.

20. The system of claim 16, wherein the second sensor is further configured to broadcast the second light intensity value over the wireless mesh network to both the first control node and the second control node.

\* \* \* \* \*